Dec. 19, 1939.  R. KILLINGSTAD  2,183,915
TREATMENT OF COMMODITIES
Filed July 24, 1936  3 Sheets-Sheet 1
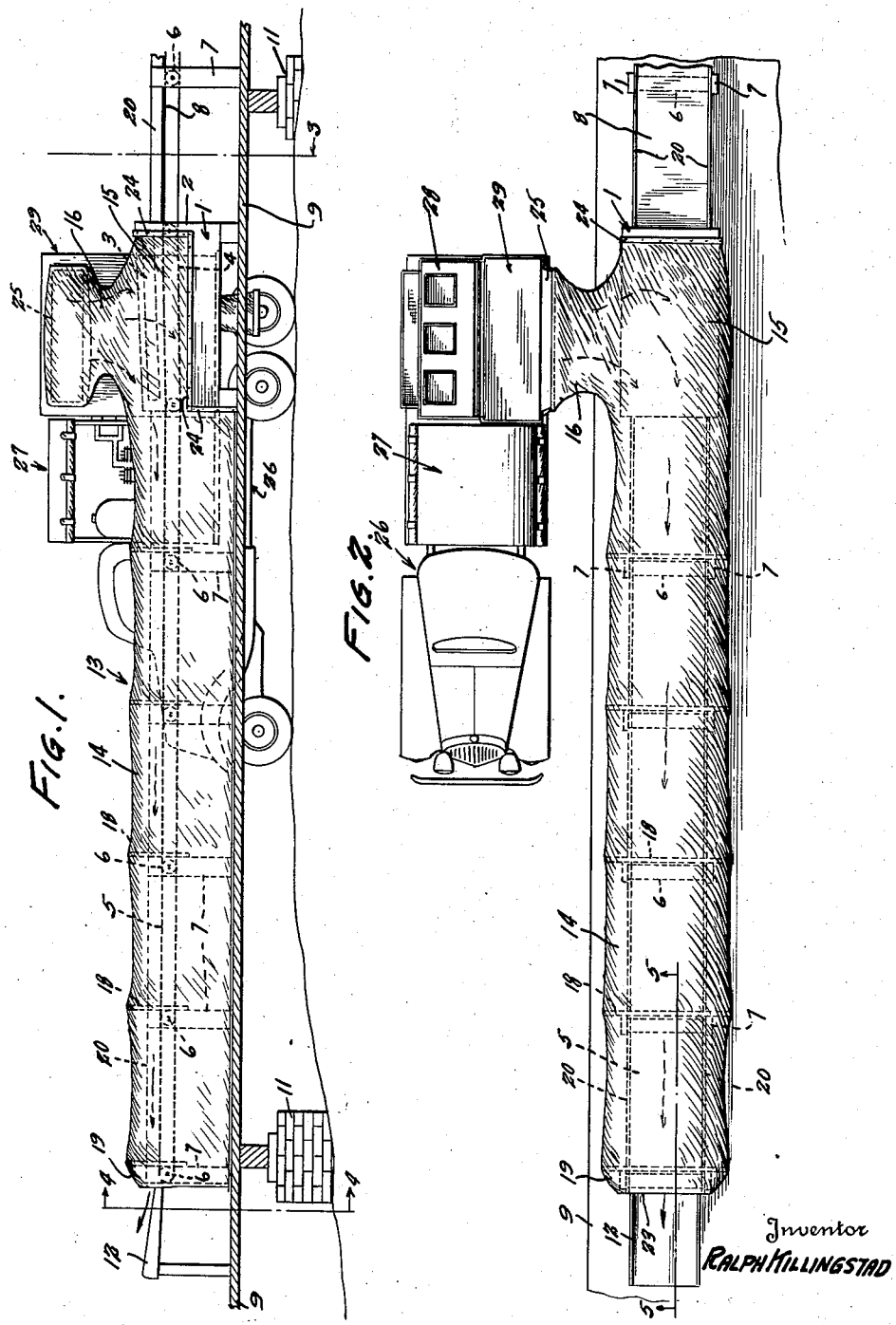
Inventor
RALPH KILLINGSTAD
By Semmes & Semmes
Attorneys

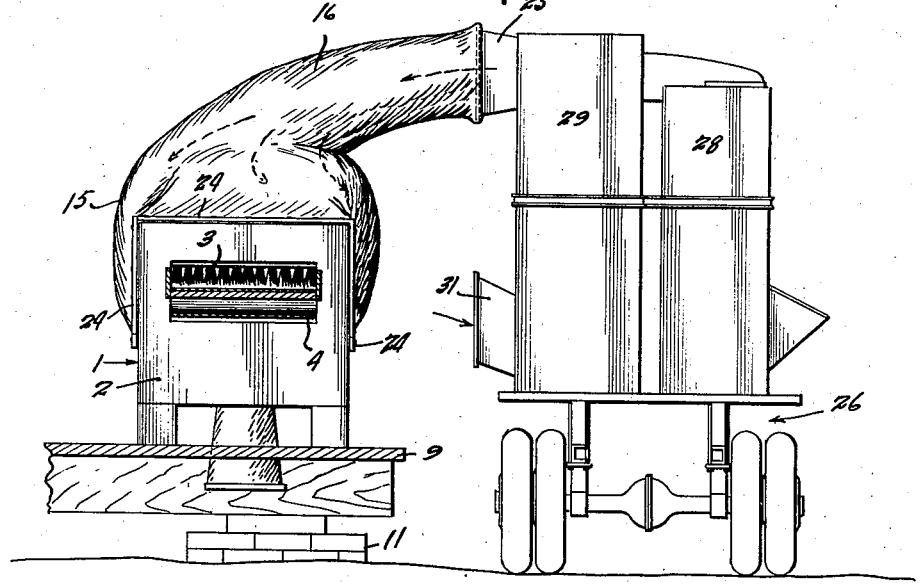
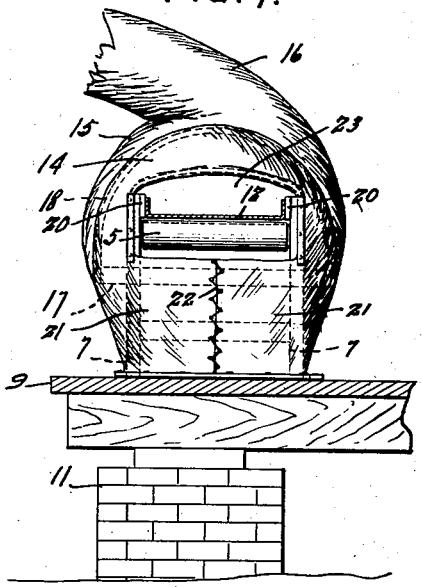
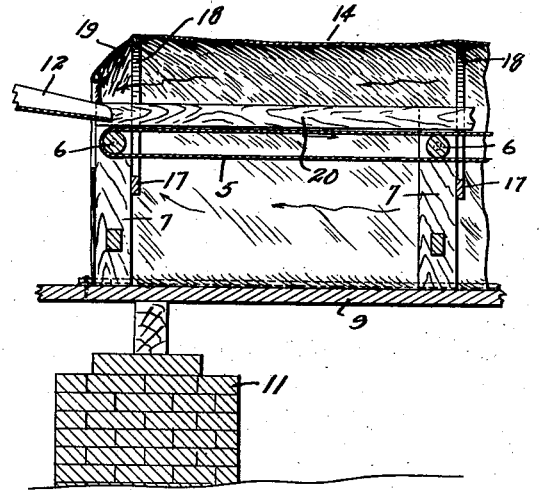

Dec. 19, 1939.   R. KILLINGSTAD   2,183,915
TREATMENT OF COMMODITIES
Filed July 24, 1936   3 Sheets-Sheet 3
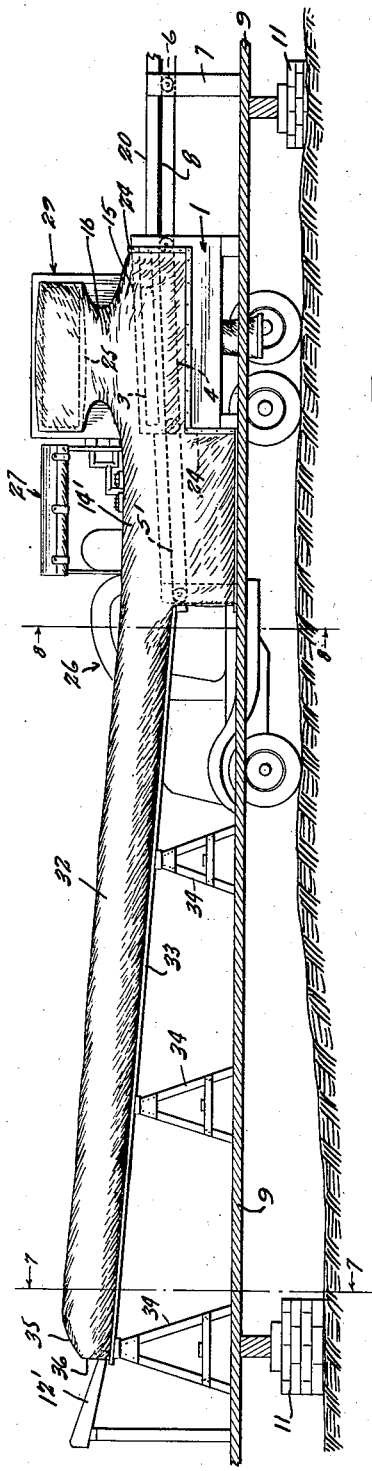
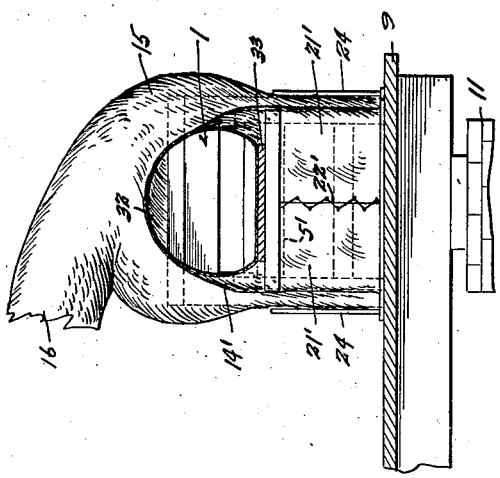
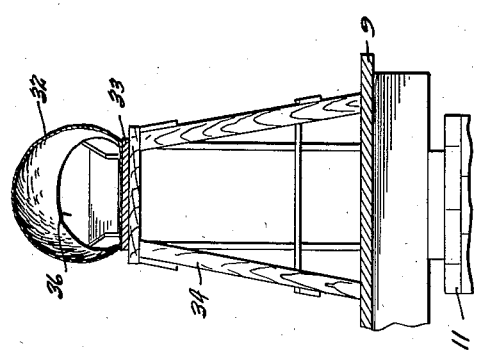
Inventor
RALPH KILLINGSTAD
By Semmes & Semmes
Attorneys Patented Dec. 19, 1939

2,183,915

UNITED STATES PATENT OFFICE 2,183,915

TREATMENT OF COMMODITIES

Ralph Killingstad, New Smyrna, Fla., assignor, by mesne assignments, to General American Precooling Corporation, Chicago, Ill., a corporation of Delaware Application July 24, 1936, Serial No. 92,424

3 Claims. (Cl. 146—202)

This invention relates to the treatment of commodities, and more especially has reference to the handling of fuzzy fruits and vegetables preparatory to packing. It finds particular application in the treatment of peaches, where the fruit is usually brushed in order to remove the hairy growth, or fuzz, on the skin of the fruit.

Peaches which have had the fuzz removed command a premium in the market, and the fruit on reaching the packing plant is usually sent through brushing machines to remove the fuzz thereon. However, these brushing machines only tend to smear the fuzz over the skin surface of a wet peach, which renders the peach even less attractive than one on which the fuzz is normally present. As a matter of fact, it is difficult to sell such peaches in the markets.

As a consequence, during rainy weather, peaches can not be picked, or at least, if picked, it is necessary to wait until they are sufficiently dry before sending them through the brushing machines. During any such waiting period, the peaches frequently spoil due to the rapid development of brown rot, thus making them unfit for sale. Even during clear weather this same problem is encountered in the early part of the day and until the dew on the peaches has evaporated. As a result, large losses have been borne by the peach growers and packers in the past.

One of the objects of this invention is to solve the above-mentioned problem.

Another object of this invention is to provide a method of treating commodities preparatory to shipping.

Yet another object of this invention is to provide a method of treating commodities prior to brushing, rubbing, polishing, or any other treatment of the exterior thereof.

A still further object of my invention is to remove the excess moisture from the surface and fuzz of a peach prior to removal of such fuzz by means of brushing or other similar treatment.

To achieve the above and other important objects, as will appear hereinafter, my invention in general resides in subjecting the commodity to a treatment preparatory to packing or shipping. More specifically, my invention embraces the idea of removing excess moisture from peaches prior to brushing to remove the fuzz from the skin surface.

In the preferred form of my invention the peaches are passed through a confined area of such size, and the rate of speed of the peaches being so controlled, that the excess moisture from the skin surface and in the fuzz is removed; and then passing such dried peaches through a brushing machine where the fuzz is removed from the skin.

While the specific process and apparatus may take various forms, there is shown in the accompanying drawings one specific embodiment which I have found to be particularly efficacious. In these drawings, in which corresponding numerals refer to the same parts—

Figure 1 is a side elevation of an apparatus in operative position to carry out my invention;

Figure 2 is a top view of the arrangement set forth in Figure 1;

Figure 3 is a view taken along the line 3—3 of Figure 1;

Figure 4 is a view of the tunnel and conveyor arangement taken along the line 4—4 of Fig. 1, looking in the direction of the arrows;

Figure 5 is a longitudinal sectional view of the receiving end of the tunnel;

Figure 6 is a side elevational view of a slightly modified form of apparatus, in which the fruit passes through a portion of the tunnel by gravity;

Figure 7 is a view taken along the line 7—7 of Fig. 6, looking in the direction of the arrows;

Figure 8 is a view taken along the line 8—8 of Fig. 6, looking in the direction of the arrows.

Most peach packing houses are provided with equipment to remove the fuzz from the skin surface of the peaches. This equipment comprises a brushing machine through which the peaches are passed to have the fuzz removed, a conveyor to carry the peaches to the brushing machines, and another conveyor at the discharge end of the brushing machine to carry the peaches to the graders where the peaches are graded as to size and defective peaches are removed.

It will be appreciated that my apparatus and process are adapted for operation in connection with such conventional equipment, and may be readily assembled to cooperate therewith. It will be noted that a minimum of space is taken up by my device and that no additional labor, insofar as the handling of the peaches is concerned, is required.

In Figure 1 there is indicated diagrammatically a brushing machine designated generally as 1. As best shown in Figure 3, this machine is provided with a casing 2 in which are suitably mounted brushes 3. A belt 4 or other appropriate type of conveyor is provided in advance the peaches through the brushes. It will of course be appreciated that any type of brushing apparatus may be employed.

As indicated above, a conveyor is provided to pass the peaches to the brushing machine, and these conveyors may vary in length and type of construction. In Figure 1 there is shown a belt conveyor 5 which is relatively long, and which is carried by rollers 6 supported upon standards 7.

As also indicated above, a conveyor is usually provided to carry the peaches from the brushing machine to the graders. A conventional type of such conveyor is shown at 8 in Figure 1, which is likewise supported by rollers 6 and standards 7.

It will be noted that the entire assembly of conveyors and brushing machine are mounted on a platform 9, which in turn is carried by supports 11.

It will likewise be observed that a chute 12 is provided which directs the fruit onto the conveyor 5. It will be appreciated that after the peaches are dumped in the chute 12, the passage of the peaches to, through and from the brushing machine 1 is entirely automatic.

As I indicated at the outset, my invention is directed to a sufficient drying of any wet or damp fruit to insure a removal of the fuzz by the brushing machine. This is preferably accomplished by subjecting the fruit to a body of cold air while it passes from the chute to the brushing machine. I provide a chamber over the conveyor 5 and brushing machine into which is introduced suitably conditioned air which flows in a direction counter to the movement of the fruit toward the brushing machine.

While various types of housing may be employed, I find it preferable to use a substantially air-impervious flexible cover such as heavy canvas, designated generally by the numeral 13. While the cover may be integrally made up, it may be considered as having a tunnel section 14, a brushing machine section 15, and an inlet throat 16.

As best shown in Figures 4 and 5, the tunnel section extends over and down the sides of the conveyor and is suitably anchored to the platform 9. Of course, the size and fit of the tunnel section 14 may be adjusted as desired, but I have found it preferable to have the chamber formed by the tunnel section extend all the way to the platform 9 and a reasonable distance above the top of the conveyor. This is accomplished by providing cross arms 17 which are mounted on standards 7 and which in turn carry semicircular supports 18 on which the canvas rests.

The entrance end of the section 14 is tapered downwardly from the top as at 19, and the canvas is carried around below the conveyor to form wings 21 which may be laced together as at 22. This provides a somewhat constricted opening 23 through which the air from the tunnel section 14 escapes and the peaches from the chute 12 pass onto the conveyor 5.

In Figure 5 there is clearly shown guard rails 20 at the sides of the conveyor and similar rails are provided for the conveyor from the brushing machine to the graders.

The brushing section 15 is suitably secured in a substantially air-tight fit around the casing 2 of the brushing machine 1 as by means of stripping 24 or any other suitable device. It is of course desirable to prevent, or at least reduce to a minimum, the escape of air from the section 15 at the points where it is secured to the brushing machine casing 2. While there may be a certain escape of air through the brushing machine itself, it will be appreciated that this is maintained at a minimum and is of no significance—the main portion of the air continuing toward the opening 23 of the tunnel section.

The inlet throat 16 extends from the section 15 to the mouth 25 of a suitable air conditioning unit to which latter it is secured in a substantially air-tight fit. It will therefore be appreciated that the conditioned air passes uninterruptedly from the inlet throat 16 into the section 15 where it is diverted toward the tunnel section 14 and passes, in a direction counter to the travel of the peaches, toward the mouth 23 of section 14.

When in section 14, the air has an opportunity to freely pass and circulate over and around the peaches on the conveyor, and I have found this circulation sufficient to insure a proper extraction of moisture from the fruit.

While the air conditioning unit may be of any desired type, I find that a portable unit such as disclosed in copending application Serial No. 39,044, filed September 3, 1935, is particularly applicable. This unit is mounted upon a suitable truck chassis designated generally 26, provided with the necessary motors, pumps, compressors, etc., designated generally 27. The air conditioning apparatus per se is composed of proper evaporative condenser elements designated generally 28, and a so-called cold diffuser 29. As best shown in Figure 3, air from the atmosphere is taken into the cold diffuser 29 through an air inlet 31, passes over the cooling coils of the diffuser 29 where the moisture of the air is condensed out, and then the cooled and dried air passes through the mouth 25 into the throat section 16.

I find that a conditioning unit such as described in the said application Serial No. 39,044 operates efficiently by cooling and drying air directly from the atmosphere. However, it will of course be appreciated that if desired a cyclic operation may be employed by merely extending a duct from the mouth 23 of the tunnel section 14 back to the intake 31 of the cold diffuser.

As heretofore stated, the length and size of the conveyors 5 found at various packing houses vary, but it will of course be appreciated that my invention is adapted for use in connection with any type conveyor, or even if no conveyor at all is provided.

In Figures 6 through 8 I have shown an application of my invention to a packing house assembly in which the feeding conveyor which feeds the brushing machine is relatively short. In these figures a conveyor 5' extends only a slight distance in front of the brushing machine 1. Of course, the amount of moisture extracted from the fruit depends not only upon the temperature, or condition, of the air, but also the period of time during which the fruit is subjected to the conditioned air. This last in turn is a function of the length of the air chamber. In view of this, and where the feeding conveyor is short, I provide an extension on the chamber through which the fruit may roll by gravity.

In Figure 6 the tunnel section 14' is shortened to accommodate itself to the conveyor 5', and an extension 32 extends from the front end of section 14'. Extension 32 may rest upon a platform 33 which is inclined to the right degree so that the fruit will roll down and onto the receiving end of conveyor 5'. The platform 33 is supported by suitable standards 34 and a chute 12' feeds the fruit into the extension 32.

In Figures 6 through 8 it will be noted that the tunnel section 14' is provided with wings 21' and lacings 22' in order to close the front end of this section, and that the extension 32 rests upon and is secured to the platform 33. Of course, if desired, the extension 32 may extend all the way down to the platform 9, but I have not found this to be necessary.

It will also be noted that the extension 32 is tapered at its front end as at 35 to form a relatively restricted opening 36. As in the case of the opening 23, opening 36 affords an exit for the air from the extension 32 and also a mouth through which the peaches may be fed.

It will be noted that in Figures 6 through 8 I have not shown the supports 18 for the canvas. In this connection it should be stated that the supports 18 are usually not necessary either in the form of device shown in Figure 1 or that shown in Figure 6, for in normal operations 12,000 to 14,000 cubic feet of air per minute are conditioned in the cold diffuser 29. This volume of air and its rate of speed is normally such as to maintain the canvas housing in a distended position.

It will be appreciated that the amount of moisture extracted from the fruit when cold air is used, is a function of the temperature of the air to which the fruit is subjected as well as certain other factors such as the speed of the air through the tunnel section and the length of time during which the fruit is subjected to the conditioned air. Insofar as the temperature of the air is concerned, this may be closely regulated by the control of the conditioning unit. A wide latitude in temperature range is permissible, depending upon the particular conditions of operation, and may extend from the neighborhood of 25° F. up to slightly below atmospheric. However, I usually find it preferable to inject the air into the throat section at a temperature of approximately 30° lower than the atmospheric temperature.

It is to be understood, of course, that my invention is not necessarily restricted to a process and apparatus in which the air is cooled, but applies to any situation in which the air is conditioned to extract moisture from the fuzz and skin surface of the fruit. For instance, under certain circumstances it may be desirable to merely de-humidify the air without lowering its temperature, and in still other instances it may be desirable to heat the air.

While I have described my invention specifically with reference to an apparatus and process for brushing the fuzz from peaches, it is perfectly obvious that it is not limited thereto. For instance, oranges sometimes are polished prior to crating and in such event my invention is efficacious in removing any moisture that might be present on the skin surface of the fruit. Or, it may even be used where it is merely desired to remove moisture from the skin surface before wrapping or crating. In such event appreciable savings in time and handling are effected over what would be necessary, for instance, in storing the produce in a drying chamber prior to packing. In general, this invention finds application wherever it is desirable to remove excess moisture from a commodity, and particularly where it is desired to remove such moisture prior to any treatment of the commodity to improve its appearance, or any other characteristic.

From the foregoing it is believed that the advantages of my invention will be readily apparent. In the first place, the device and process are capable of operation with a minimum, or no, change in the existing equipment now found at packing houses. The invention possesses great flexibility and is adapted for use with various types of packing house equipment. An economy of space is effected and no additional labor in the handling of the fruit is required. Likewise, no additional time is necessitated in carrying out the process. All of this is of major importance, for packing houses are of certain definite capacities, and invariably run at maximum capacities. An excess of fruit over that capacity usually results in a loss of such excess.

Insofar as the equipment of my invention is concerned, it will be appreciated that it is of simple and inexpensive structure, can be set up and dismantled with a minimum of effort and time, and in operation only the conditioning unit requires any attention at all.

Of prime importance is the fact that with the use of my invention, the fruit may be picked and packed regardless of weather conditions, and thus both the manual labor in the fields and at the packing house may be utilized uninterruptedly and at a maximum capacity, thereby effecting substantial economies in the picking and packing of the fruit and at the same time insuring a product of the desired characteristics, both insofar as appearance and soundness are concerned.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. An apparatus for treating fuzzy commodities comprising a device for brushing the fuzz from the commodities, a conveyor adapted to pass the commodities toward the brushing device and having one end connected with the brushing device, a housing for the brushing device and conveyor, an air inlet adjacent the brushing device and a restricted air outlet adjacent the free end of the conveyor, and an air conditioning unit operatively connected with the air inlet in such a manner that chilled air may be introduced at high velocity in a direction counter to the direction of the movement of the conveyor to the brushing device.

2. An apparatus for treating fuzzy commodities comprising a device for removing fuzz from the commodities, a conveyor for feeding commodities to the brushing device, another conveyor for removing the commodities from the brushing device, a flexible, substantially air-impervious open-ended housing extending over the brushing device and the first-mentioned conveyor, an air inlet throat in proximity to the brushing device adapted to admit chilled air to the housing, and a portable air conditioning unit connected to the air inlet housing in such a manner that a stream of chilled air at high velocity may be introduced to the housing in a direction counter to the direction of the movement of the conveyor towards the said brushing device.

3. A method of treating fuzzy commodities such as peaches comprising passing said commodities at a predetermined speed along a predetermined path through an inclosed passageway to a certain point, subjecting the commodities during such travel to a stream of chilled air at a relatively high velocity, regulating the speed of movement of said commodities so that their surface will be thoroughly dried and chilled during such movement, and removing the fuzz upon arrival of the commodities at the above mentioned point, said stream of air flowing in a direction counter to the direction of movement of the commodities.

RALPH KILLINGSTAD.